(12) United States Patent
Nehmadi et al.

(10) Patent No.: US 10,444,357 B2
(45) Date of Patent: Oct. 15, 2019

(54) SYSTEM AND METHOD FOR OPTIMIZING ACTIVE MEASUREMENTS IN 3-DIMENSIONAL MAP GENERATION

(71) Applicant: VayaVision, Ltd., Nili (IL)

(72) Inventors: Youval Nehmadi, Nili (IL); Shmuel Ur, Shorashim (IL); Ronny Cohen, Ramat Hasharon (IL)

(73) Assignee: VAYAVISION LTD., Or Yehuda (IL)

( * ) Notice: Subject to any disclaimer, the term of this patent is extended or adjusted under 35 U.S.C. 154(b) by 301 days.

(21) Appl. No.: 15/153,302

(22) Filed: May 12, 2016

(65) Prior Publication Data

US 2016/0291155 A1    Oct. 6, 2016

Related U.S. Application Data

(63) Continuation-in-part of application No. 15/087,222, filed on Mar. 31, 2016, now Pat. No. 10,024,965, and
(Continued)

(51) Int. Cl.
*G06K 9/00* (2006.01)
*G01S 17/08* (2006.01)
(Continued)

(52) U.S. Cl.
CPC .............. *G01S 17/08* (2013.01); *B60R 11/04* (2013.01); *G01S 7/497* (2013.01); *G01S 17/023* (2013.01);
(Continued)

(58) Field of Classification Search
CPC ............ G06K 9/2027; G06K 7/10118; G06K 7/10128; G06K 7/10138; G06K 7/10148;
(Continued)

(56) References Cited

U.S. PATENT DOCUMENTS 5,128,874 A    7/1992    Bhanu et al.
5,195,144 A    3/1993    Parquier et al.
(Continued)

FOREIGN PATENT DOCUMENTS

DE    10361869 A1    7/2005
EP    2204670 B1    6/2014
(Continued)

OTHER PUBLICATIONS

The International Search Report and the Written Opinion for PCT/US2016/025252, ISA/RU, Moscow, Russia, dated Aug. 11, 2016.
(Continued)

*Primary Examiner* — Eric Rush
(74) *Attorney, Agent, or Firm* — Reches Patents

(57) ABSTRACT

A method and control system for optimizing active measurements are presented. In an embodiment, the method includes emitting at least one active signal in at least one direction; determining whether a return signal is detected for each of the at least one active signal; upon detecting at least one return signal for the at least one active signal: measuring a strength of each return signal; comparing the measured strength of each return signal to at least one optimal return signal strength; and determining, based on the comparison, an optimized configuration for active measurement emissions in one or more directions.

20 Claims, 6 Drawing Sheets

Related U.S. Application Data a continuation-in-part of application No. 15/087,186, filed on Mar. 31, 2016.

(60) Provisional application No. 62/160,988, filed on May 13, 2015, provisional application No. 62/141,296, filed on Apr. 1, 2015.

(51) Int. Cl.
| | | |
|---|---|---|
| *G01S 17/89* | (2006.01) | |
| *B60R 11/04* | (2006.01) | |
| *G01S 19/03* | (2010.01) | |
| *G01S 7/497* | (2006.01) | |
| *G06K 7/10* | (2006.01) | |
| *G06K 9/20* | (2006.01) | |
| *G01S 17/42* | (2006.01) | |
| *G06T 17/05* | (2011.01) | |
| *G01S 17/02* | (2006.01) | |
| *G01S 17/93* | (2006.01) | |
| *G01C 21/26* | (2006.01) | |

(52) U.S. Cl.
CPC ............ *G01S 17/42* (2013.01); *G01S 17/89* (2013.01); *G01S 17/936* (2013.01); *G01S 19/03* (2013.01); *G06K 7/10217* (2013.01); *G06K 7/10584* (2013.01); *G06K 9/00805* (2013.01); *G06K 9/2027* (2013.01); *G06T 17/05* (2013.01); *G01C 21/26* (2013.01); *Y10S 901/01* (2013.01)

(58) Field of Classification Search
CPC ........... G06K 7/10158; G06K 7/10168; G06K 7/10178; G06K 7/10198; G06K 7/10217; G06K 7/10584; G06K 7/10752; G06K 7/10851; G06K 9/00805; G01S 7/497; G01S 2007/4975; G01S 17/023; G01S 17/08; G01S 17/42; G01S 17/89; G01S 17/936; G01S 19/03; H04N 5/235; H04N 5/2351; H04N 5/2352; H04N 5/2353; H04N 5/2354; G06T 17/05; B60R 11/04; G01C 21/26; Y10S 901/01
USPC ........ 382/100, 106, 108, 115, 117, 118, 128, 382/132, 153, 154, 312, 317, 321, 325; 396/65, 155, 159, 164, 166–168; 342/73, 342/82, 85, 174; 250/201.2, 201.6, 204, 250/205, 221, 354.1
See application file for complete search history.

(56) References Cited

U.S. PATENT DOCUMENTS

| | | | |
|---|---|---|---|
| 5,745,806 A * | 4/1998 | Saito | G02B 7/32 396/106 |
| 5,831,717 A * | 11/1998 | Ikebuchi | G01S 7/484 356/4.01 |
| 5,870,178 A * | 2/1999 | Egawa | G01C 3/085 396/106 |
| 5,896,103 A * | 4/1999 | Bunch | G01S 7/2927 342/92 |
| 5,923,417 A | 7/1999 | Leis | |
| 6,115,114 A * | 9/2000 | Berg | G01S 17/42 356/4.01 |
| 6,323,941 B1 * | 11/2001 | Evans | G01S 17/023 250/339.02 |
| 6,502,053 B1 | 12/2002 | Hardin et al. | |
| 6,522,393 B2 * | 2/2003 | Higashino | G01S 17/023 396/106 |
| 6,553,130 B1 | 4/2003 | Lemelson et al. | |
| 6,847,462 B1 * | 1/2005 | Kacyra | G01B 11/002 250/234 |
| 7,385,626 B2 | 6/2008 | Aggarwal et al. | |
| 7,508,496 B2 | 3/2009 | Mettenleiter et al. | |
| 7,619,754 B2 | 11/2009 | Riel et al. | |
| 7,852,461 B2 * | 12/2010 | Yahav | G01S 17/023 356/3.08 |
| 7,957,639 B2 * | 6/2011 | Lee | G03B 7/003 396/213 |
| 8,125,622 B2 | 2/2012 | Gammenthaler | |
| 8,189,051 B2 | 5/2012 | Shih et al. | |
| 8,290,208 B2 | 10/2012 | Kurtz et al. | |
| 8,446,492 B2 | 5/2013 | Nakano et al. | |
| 8,547,374 B1 | 10/2013 | Sadjadi et al. | |
| 8,548,229 B2 | 10/2013 | Badino et al. | |
| 8,587,686 B1 | 11/2013 | Riza et al. | |
| 8,723,717 B2 | 5/2014 | Saito | |
| 8,736,818 B2 | 5/2014 | Weimer et al. | |
| 8,761,594 B1 | 6/2014 | Gross et al. | |
| 8,791,851 B2 | 7/2014 | Elad et al. | |
| 9,164,511 B1 | 10/2015 | Ferguson et al. | |
| 9,188,980 B2 | 11/2015 | Anderson | |
| 9,774,789 B2 * | 9/2017 | Ciurea | H04N 5/2258 |
| 2001/0045981 A1 | 11/2001 | Gloger et al. | |
| 2002/0097995 A1 * | 7/2002 | Nakata | G03B 13/00 396/104 |
| 2005/0200832 A1 | 9/2005 | Kawai et al. | |
| 2006/0274918 A1 * | 12/2006 | Amantea | G06K 9/00604 382/117 |
| 2007/0165967 A1 * | 7/2007 | Ando | G06K 9/00805 382/291 |
| 2007/0189455 A1 * | 8/2007 | Allison | A61B 6/00 378/95 |
| 2008/0199165 A1 * | 8/2008 | Ng | G03B 17/00 396/51 |
| 2009/0109082 A1 * | 4/2009 | Rose | G01S 7/021 342/89 |
| 2010/0014781 A1 | 1/2010 | Liu et al. | |
| 2010/0040285 A1 | 2/2010 | Csurka et al. | |
| 2010/0191117 A1 * | 7/2010 | Kabakov | A61B 8/02 600/453 |
| 2010/0245535 A1 | 9/2010 | Mauchly | |
| 2010/0315618 A1 * | 12/2010 | Hertzman | G01S 7/483 356/5.01 |
| 2011/0141306 A1 | 6/2011 | Nakano et al. | |
| 2011/0292406 A1 | 12/2011 | Hollenbeck et al. | |
| 2012/0026510 A1 * | 2/2012 | Crampton | G01B 11/2518 356/601 |
| 2012/0044093 A1 * | 2/2012 | Pala | G01S 7/4863 340/963 |
| 2012/0044476 A1 * | 2/2012 | Earhart | G01S 3/7867 356/4.01 |
| 2012/0148100 A1 * | 6/2012 | Kotake | G06T 7/75 382/103 |
| 2012/0314037 A1 | 12/2012 | Nehmadi et al. | |
| 2012/0326959 A1 | 12/2012 | Murthi et al. | |
| 2013/0021595 A1 | 1/2013 | Guetta | |
| 2013/0107065 A1 | 5/2013 | Venkatraman et al. | |
| 2013/0174102 A1 | 7/2013 | Leu | |
| 2014/0077988 A1 * | 3/2014 | Saito | G01S 7/41 342/27 |
| 2014/0078263 A1 | 3/2014 | Kim | |
| 2014/0094307 A1 | 4/2014 | Doolittle et al. | |
| 2014/0132722 A1 * | 5/2014 | Martinez Bauza | G06T 7/521 348/46 |
| 2014/0139639 A1 | 5/2014 | Wagner et al. | |
| 2014/0240464 A1 * | 8/2014 | Lee | G01S 17/08 348/47 |
| 2014/0267631 A1 * | 9/2014 | Powers | H04N 5/23241 348/47 |
| 2015/0071541 A1 | 3/2015 | Outub et al. | |
| 2015/0340875 A1 | 11/2015 | Prasad | |
| 2015/0356357 A1 | 12/2015 | McManus et al. | |
| 2016/0018526 A1 | 1/2016 | Bossche et al. | |
| 2016/0047903 A1 * | 2/2016 | Dussan | G01S 7/484 356/5.01 |

(56) References Cited

U.S. PATENT DOCUMENTS

FOREIGN PATENT DOCUMENTS

| WO | 2000012960 | A1 | 3/2000 |
| WO | 2008070319 | A2 | 6/2008 |

OTHER PUBLICATIONS

The EP Search Report for EP Application No. 16774190.9 dated Jan. 28, 2019, EPO, Munich, Germany.

* cited by examiner

SYSTEM AND METHOD FOR OPTIMIZING ACTIVE MEASUREMENTS IN 3-DIMENSIONAL MAP GENERATION

CROSS-REFERENCE TO RELATED APPLICATIONS

This application claims the benefit of U.S. Provisional Application No. 62/160,988 filed on May 13, 2015. This application is also a continuation-in-part of U.S. patent application Ser. No. 15/087,186 filed on Mar. 31, 2016, now pending. This application is also a continuation-in-part of U.S. patent application No. Ser. 15/087,222 filed on Mar. 31, 2016, now pending. Both the Ser. Nos. 15/087,186 and 15/087,222 claim the benefit of U.S. Provisional Application No. 62/141,296 filed on Apr. 1, 2015, and U.S. Provisional Application No. 62/160,988 filed on May 13, 2015. The contents of the above-referenced applications are hereby incorporated by reference.

BACKGROUND

An autonomous car (also known as a driverless car, self-driving car, or robotic car) is a vehicle that navigates without human control. An autonomous vehicle senses its environment to detect surroundings using radar, Lidar, GPS, Odometer, or computer vision. Advanced control systems interpret sensory information to identify appropriate navigation paths, as well as obstacles and relevant signage. Autonomous cars are equipped with control systems for analyzing sensory data in order to distinguish between different cars or obstacles on the road. Currently, driverless technology is developed by Google®, Tesla®, and some other vehicles manufactures, such as Audi®, BMW®, Nissan®, and the like.

Other companies such as, e.g., Mobileye®, are in the marketplace trying to provide solutions for hands-free driving technology. Use of this technology is typically limited to particular driving infrastructures such as, e.g., highways or country roads. The corner-stone of such hands-free driving and autonomous vehicles technologies is the rendering or generation of a 3-dimensional (3D) map of a scene at any given moment during or immediately prior to motion. Such a map tries to mimic a scene as would have been seen by a driver.

In addition, other technologies utilize 3D maps for, e.g., navigational purposes. Drones and other vehicles may utilize 3D maps at least in part to control movements. Further, virtual games and/or movies may be controlled via user input with respect to a 3D map.

The rendering of such 3D-maps is typically accomplished by measuring distances to many points in the 3D space to determine the existence of objects and their respective distances from the vehicle. The rendered 3D-maps may be combined and processed to produce driving decisions by the vehicle. Existing solutions for rendering detailed 3D-maps are based on LiDar (or LADAR) systems. A LiDar system measures distance to an object by illuminating multiple targets (points in the space) with one laser beam or multiple laser beams. Such existing solutions configure the LiDar system to scan the entire environment (scene). This requires a large number of laser measurements to render a single 3D-map.

For example, FIG. 1 shows an image 100 of a scene for which a 3D-map is generated. Some existing solutions implemented by hands-free and autonomous driving technologies measure the distance to each point 110 in the image 100. Thus, a laser beam illuminates each such point to render the 3D-map. In many examples, the LiDar system does not have any prior knowledge of the scene, e.g., a picture of the scene. To this aim, such technologies are based on very complex and expensive equipment. For example, a robotic car made by Google® includes equipment with a LiDar system worth about $70,000. The LiDar system includes a 64-beam laser. Due to the high cost of the hardware for rendering the 3D-maps, mass production of autonomous vehicles is not feasible. It should be noted that only a few points 110 are specifically labeled in FIG. 1 merely for simplicity purposes.

In addition, widespread production of the autonomous vehicle using existing Lidar systems would create hazardous conditions to pedestrians, drivers and/or passengers because of the high number of laser beams that would be transmitted from each vehicle and would likely hit a person in the line of sight. Further, the existing LiDar solutions are configured to transmit laser beams at the highest available energy level. This is performed to measure a point at a maximum range of the Lidar system.

Moreover, the generation of 3D-maps by scanning the entire scene will increase the crosstalk. This is due to the high number of laser beams being transmitted by autonomous vehicles equipped with such scanning systems. As a result, the resulting resolution of 3D-maps generated by scanning the entire scene may be limited.

Further, some existing solutions are configured to transmit pulses of light at the highest available energy for each distance being measured. However, the amount of energy actually needed to accurately determine the distance to an object may vary based on the method utilized to determine distance, the resolution required, the material of the object (e.g., color of the material), the angle of the object relative to the source of light, and the distance to the object. Thus, use of only laser beams having the highest available energy frequently results in using higher energy levels than may be required. This unnecessarily wastes energy and increases the risk of harm to people occupying areas in which laser-based and similar measurements are performed.

It would therefore be advantageous to provide a solution for generating 3D-maps that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for optimizing active measurements. The method comprises emitting at least one active signal in at least one direction; determining whether a return signal is detected for each of the at least one active signal; upon detecting at least one return signal for the at least one active signal: measuring a strength of each return signal; comparing the measured strength of each return signal to at least one optimal return signal strength; and determining, based on the comparison, an optimized configuration for active measurement emissions in one or more directions.

Certain embodiments disclosed herein also include an apparatus for optimizing active measurements. The apparatus comprises an active sensor; a control circuit configured to: control the active sensor to emit at least one active signal in at least one direction; determine whether a return signal is detected for each of the at least one active signal; upon detecting at least one return signal for the at least one active signal, measure a strength of each return signal; compare the strength of each measure return signal to at least one optimal return signal strength; determine based on the comparison, an optimized configuration for active measurement emissions in one or more directions; and configure the active sensor with the optimized configuration.

Certain embodiments disclosed herein also include a control circuit for controlling optimized active measurements. The control circuit is configured to cause at least one active sensor to emit at least one active signal in at least one direction; determine whether a return signal is detected by the at least one active sensor for each of the at least one active signal; upon detecting at least one return signal for the at least one active signal: measure a strength of each detected at least one return signal; compare the strength of each measure return signal to at least one optimal return signal strength; and determine, based on the comparison, an optimized configuration for active measurement emissions in one or more directions.

Certain embodiments disclosed herein also include a method for optimizing active measurements. The method comprises receiving an image of a scene captured by a passive sensor; analyzing the received image to estimate a distance to at least one object in the scene; determining, based on the estimated distance, an optimized configuration for active measurement emissions in one or more directions; and setting an active sensor to perform the active measurement emissions based on the optimized configuration.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
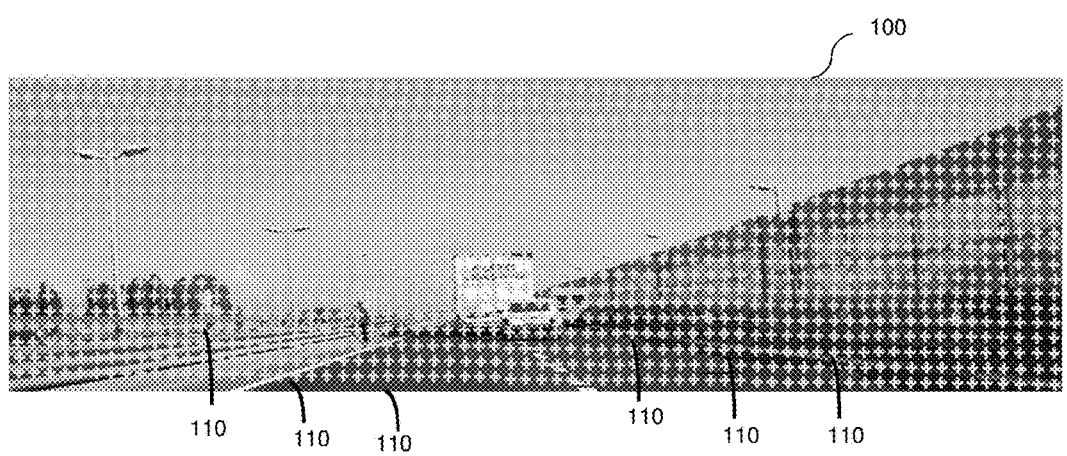
FIG. 1 is a picture of a scene for which a 3D-map is generated using a conventional approach.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, 3D-maps are rendered or otherwise generated based on active measurements, passive measurements, and/or analysis of information related to such measurements. In some embodiments, the 3D-maps may be based on measurements captured from a vehicle. In an embodiment, active measurements are laser measurements, while passive measurements are achieved by image processing. Therefore, the disclosed embodiments allow for provision of a complete 3D-map of a scene while using a small number of low-energy laser beams. In certain configurations, the disclosed embodiments can be utilized to generate a high-resolution 3D-map of certain sections of the environments without performing active measurements for the entire scene. The utilization of a few active measurements reduces the risk of human exposure to laser beams. In some embodiments, the scene may be a field of view captured simultaneously by an apparatus for causing generation of the 3D-map.

Figure 2:
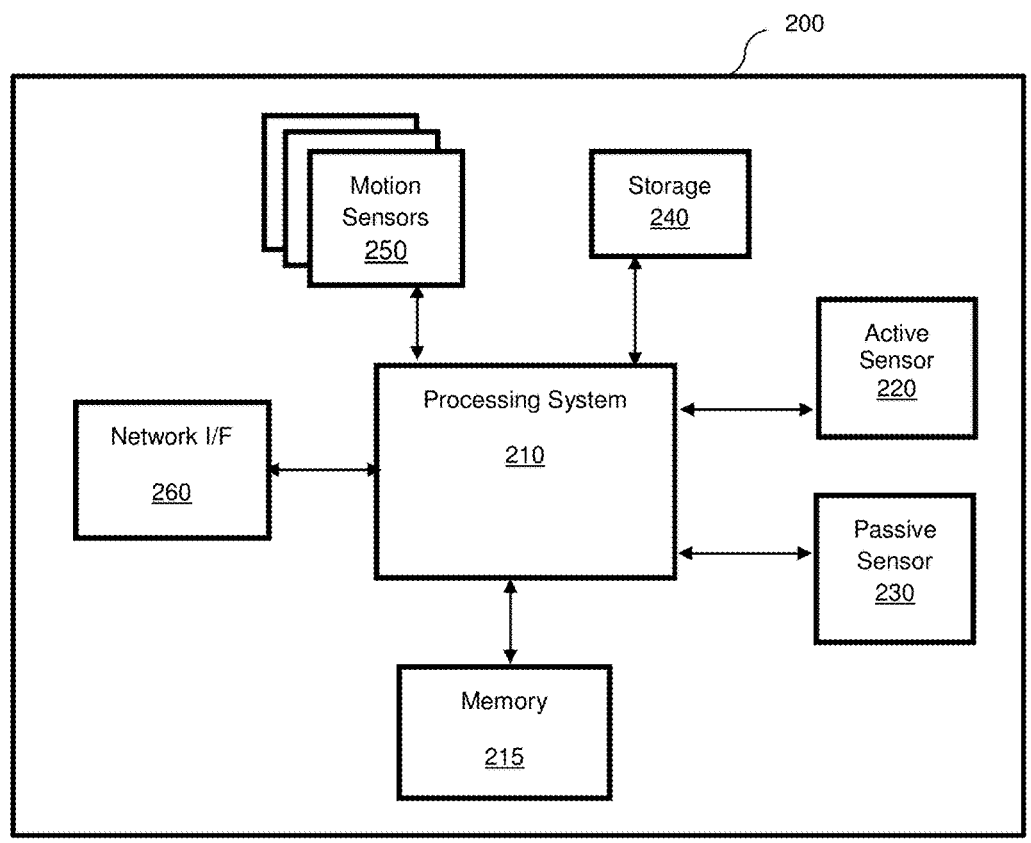
FIG. 2 is a block diagram of an apparatus configured to generate 3D-maps from a vehicle according to one embodiment.

FIG. 2 shows an example block diagram of an apparatus 200 configured to generate 3D-maps from a vehicle according to one embodiment. The apparatus 200 includes a memory 215, and an active sensor 220 connected to the processing system 210. In certain configurations, the apparatus 200 further includes a passive sensor 230, a storage 240, one or more motion sensors 250, and a network interface 260 connected to the processing system 210.

The apparatus 200 can be, e.g., mounted on or integrated in a vehicle and/or camera. Such a vehicle may include, for example, a car, a truck, a bus, a drone, a robot, and the like. The camera may be, but is not limited to, a camera utilized to capture video for 3D movies. The apparatus 200 can be utilized to generate 3D-maps of the scene as would be observed by an operator (e.g., a driver) of the vehicle. In an embodiment, the apparatus 200 is configured to control part or all of the operation of the vehicle based on analysis of the generated 3D-maps. Therefore, the apparatus 200 can be utilized in applications related to autonomous vehicles, hands-free driving systems, driver assistance systems, and the like.

The passive sensor 230 may be an image sensor (e.g., a camera) configured to passively acquire images. The acquired images can be processed by processing system 210 or by the passive sensor 230 using image processing techniques.

The active sensor 220 is configured to perform active measurements in specific directions to determine the distance from objects in the scene. In an embodiment, the active measurements are laser measurements. In a further embodiment, the active sensor 220 is configured to illuminate light beams in specific directions (determined by, e.g., the processing system 210) and to detect the light beams reflected off of objects in the scene. The distance from an object can be computed based on the energy and reflection angle of each reflected light beam. The active sensor 220 can be realized as, but not limited to, an active stereovision, a structured light, a time-of-flight (TOF), and the like.

In yet a further embodiment, the active sensor 220 is configured to determine and utilize optimized active measurements. To this end, the active sensor 220 may be configured to control energy levels for active measurements.

The optimized active measurement energy levels may be determined based on previously known distances to objects in a scene. The previously known distances may be based on for example, previous active and/or passive measurements, known positions of objects in the scene, and the like. The determined energy levels may be set based on parameters such as, but not limited to, pulse length, power, and/or height. Thus, an energy level may be lower than another energy level if, for example, the pulse length, power, and/or height is lower.

In an embodiment, if a return signal for an active measurement sent in a direction by the active sensor 220 cannot be measured, the energy level for active measurements in that direction may be increased and subsequent active measurements may be utilized until a return signal can be measured. Active measurements for the direction may be further adjusted to optimize energy levels. Optimizing active measurements with respect to energy levels of the active measurements allows for reduced energy consumption and harm to objects in the scene.

In another embodiment, determining the optimized active measurements may further include determining an optimal path between locations in the scene for which a plurality of active measurements will be taken. The optimal path may be utilized to reduce time and energy utilized to change direction of the active emissions when performing multiple active measurements. The plurality of active measurements may be performed by, e.g., utilizing one or more mirrors or MEMS mirrors to capture return signals based on active emissions and moving the mirrors or MEMS mirrors based on the directions of the active emissions.

The optimal path may be determined based on, but not limited to, a time for changing the direction of the active emission from a first direction to a second direction, movements (direction, speed, acceleration, etc.) of the apparatus 200 and/or of mirrors or MEMS mirrors, a minimum time needed between measurements (e.g., 2 microseconds), and the like. The minimum time needed between active measurements may be further based on, e.g., a maximum range for objects in the scene. The optimal path may be determined such that the time between active measurements is minimized.

The processing system 210 is configured to process data (e.g., energy level, direction, reflection angle of the emitted and reflected beam) in order to generate a 3D-map of the entire environment or of certain objects in the environment. As will be discussed below, the number of active measurements is limited to certain points and/or surfaces in the space as the initial scanning is performed using the image or images acquired by the passive sensors 230. In an embodiment, to create the 3D-map additional information, such as previously acquired images or previously generated 3D-maps, previously determined active measurements and/or sensory information be gathered from the motion sensors 250 may be utilized. The motion sensors 250 may include, but are not limited to, a global positioning system (GPS), an accelerometer, a proximity sensor, an odometer, and the like. The additional information together with the active/passive measurements can be utilized by the processing system 210 to determine a size of each object, its speed, and its direction relative to the vehicle.

According to certain embodiments, the processing system 210 is configured to generate 3D maps. To this end, the processing system 210 may be configured to fuse active and passive measurements; determine stationary or nearly stationary objects; actively measure the distance only from moving objects; and estimate distance from objects using the top possible velocity of objects and/or using passive measurements.

The fusion of active and passive measurements may include utilizing the active sensor 220 to measure objects in areas where the passive sensor 230 does not provide a reliable measurement. Whether the passive sensor 230 can provide a reliable measurement for an object may be based on, but not limited to, a classification of the object, a visibility of the object in the image, and the like. In an embodiment, if a reliable passive measurement can be achieved, the active sensor 220 is not utilized. Thus, the disclosed embodiments may significantly reduce the number of active measurements performed by the active sensor 220.

As such, fewer laser beams or other sources may be utilized, thereby reducing energy consumption, crosstalk, and hazardous conditions, as well as achieving higher resolution. In an embodiment, the apparatus 200 can be configured such that only suspicious objects will be actively measured using the active sensor 220. A suspicious object may be any object that requires active measurement to accurately generate a map based thereon. The classification of objects are discussed below. An object may be suspicious if, e.g., the object is non-stationary (i.e., moving) and/or in close-proximity to the apparatus 200. As an example, if the apparatus 200 is mounted on a car, pedestrians will be considered as suspicious objects while trees in the background are not.

In an embodiment, the processing system 210 is configured to determine which object is stationary or near stationary based on images provided by the passive sensor 230. For example, using image recognition, the processing system 210 may be configured to determine stationary objects such as, e.g., a house, a tree, a pole, etc. In a further embodiment, when the passive sensor 230 is fixed, the processing system 210 may be configured to determine if an object is stationary by comparing two consecutive images and determining which objects have been moved relative to stationary objects, based on the comparison. As an example, if the passive sensor is fixed to the side of a building in an environment, consecutive images may be compared to determine whether any objects in the scene have been moved relative to stationary objects. In an embodiment, when the passive sensor 230 is in motion, the distance from stationary objects can be measured using GPS and the speed of the car.

In yet a further embodiment, determining whether objects are stationary may be based on comparisons of frames (e.g., images) captured by the passive sensor 230. The comparisons may include, but are not limited to, determining changes in distances between sets of points in the frames. In an example embodiment, each distance change between two points may be equal to a difference between the 3D distance between the points as seen in a first frame with the 3D distance between the points as seen in a second frame. Any object that is determined to have moved may be associated with a non-stationary object. In an embodiment, an object may be determined to have moved if, for example, a sum of all distance changes related to the object is above a predefined threshold. In another embodiment, an object may be determined to have moved if the sum of distance changes related to the point is greater than the sum of distance changes related to each of the other objects above a predefined threshold. In yet another embodiment, an object may be determined to have moved if a distance change related to an object in a subsequent frame is greater than a distance change related to the object in a prior frame above a predefined threshold.

In another embodiment, determining whether objects in images are stationary may be based on predicted locations of objects in an image. A prediction image may be generated based on a frame of a currently acquired image or generated 3D-map. The prediction image may be further based on a movement of the sensor acquiring the current image or providing information used to generate the current 3D-map. Based on the current frame and/or any new position or orientation of the sensor, a prediction frame illustrating predicted positions of the objects at a subsequent time (assuming the objects do not move) is generated. The prediction frame may be compared to a subsequent frame based on sensor readings at the subsequent time to determine if there are any differences between locations of the objects. In an embodiment, if a difference in location of an object between the prediction frame and a corresponding subsequent frame is above a predefined threshold, it may be determined that the object has moved.

In an embodiment, when the passive sensor 230 is in motion, the distance from stationary objects can be measured using GPS and the speed of the car. In another embodiment, the distance from stationary objects can be measured without using GPS by comparing frames (e.g., acquired images) of passive sensor information and/or 3D mapping information. In a further embodiment, finding the distance and/or angle change between any two frames may be determined, for each pair of corresponding points in the frames, based on a weighted score. To this end, in an embodiment, finding the distance or angle change between two frames may further include determining matching or otherwise corresponding points in the frames. In yet a further embodiment, the weighted score may be based on, but not limited to, a degree of error associated with the distance of the point in each frame such as, e.g., error based on noise.

In a further embodiment, a prediction frame may be generated based on 3D or 2D mapping information as well as a location and orientation of a sensor. The prediction frame may be a 3D image illustrating predicted positions of stationary (i.e., non-moving) objects included in the 3D-mapping information. Such stationary objects may include, but are not limited to, trees, billboards, signs, buildings, and other permanent or semi-permanent items or fixtures. The prediction frame may be utilized to, e.g., fill in exposed gaps of a previous frame (for example, when an object moves, the prediction frame may be utilized to illustrate a prediction for items behind the previous location of the moved object).

In another embodiment, the passive measurements may be performed based on movements of objects classified as non-stationary and non-suspicious. To this end, passively measuring the distance may include, but is not limited to, determining a boundary speed of the object and a direction of movement of the object. The boundary speed is a speed at which the boundary (i.e., outer surface) of the object is traveling. Based on the determined boundary speed and direction, a distance to the object may be estimated. In an embodiment, the estimated distance may be further based on a previously known distance to the object and/or previously generated 3D-maps including the object. Selectively passively measuring distances to objects based on classifications and previously known distances allows for decreased numbers of active measurements, thereby reducing energy consumption and harmful effects on objects in the environment.

In a further embodiment, the processing system 210 is configured to estimate the distance from non-stationary objects using a maximum and/or minimum possible speed of such objects. The maximum or minimum possible speed of an object may be utilized as the boundary speed. For example, if a distance from a pedestrian is first measured, then the distance range (e.g., between 0 and 2 meters) representing possible distances of that pedestrian at a given time can be determined based on a predetermined maximum velocity of a person. The estimation allows for more reliable passive measurements on moving objects, thereby allowing for further reduced usage of active measurements and, as a result, lower energy consumption.

In yet another embodiment, the processing system 210 is configured to selectively utilize active measurements for objects based on the presence or absence of edges and/or patterns. Accordingly, objects having clear edges or patterns (e.g., objects having edges or patterns shown in images with clarity above a predefined threshold) may be classified as such. In an embodiment, the distances to objects having clear edges or patterns may be determined via passive measurements, while objects not having clear edges or patterns may be determined via active measurements. In a further embodiment, if an object has clear edges and patterns but its distance cannot be estimated via passive measurement, active measurement may be performed on the object.

As a non-limiting example, the processing system 210 may be configured to utilize stereovision for smaller objects (i.e., objects having a size in pixels of an image below a predefined threshold) and for objects having clear edges. An image including traffic signs, poles, lampposts, a vehicle, and a road is captured by the passive sensor 230. It is determined that edges of the traffic signs, poles, lampposts, and the sides of the vehicle have clear edges. Accordingly, stereovision is used to determine the distance to each of these clear edge objects based on the captured image. It is determined that the other portions of the car and the road are both above the predefined threshold and lack clear edges; accordingly, distances to such objects lacking clear edges are actively determined.

The processing system 210 will not trigger another active measurement with respect to the pedestrian if the pedestrian is located within a range that does not require any action (e.g., walking in a sidewalk across the street from the vehicle). An action may include, for example, controlling the vehicle. Whether an action is required may be based on a predefined safe distance threshold. The safe distance threshold may include, but is not limited to, the speed of the vehicle and/or object, the distance of the object from the apparatus 200, a type of the object, combinations thereof, and the like. In a further embodiment, active measurements may be performed when an estimated distance for a moving object (e.g., based on a boundary speed and a direction of the object) does not meet a safe distance threshold. An action may include, for example, controlling a hands free or autonomous vehicle.

In an embodiment, the processing system 210 is configured to estimate the distance of the processing system 210 from non-stationary and stationary objects using passive measurements. Specifically, the distance may be estimated based on the object's approximate size and the amount of pixels the object occupies in an image acquired by the passive sensor 230. Such an estimation may further include determining if the object is in close-proximity to the vehicle or not. For some objects that are not in close-proximity, no active measurement by the active sensor 220 is required. The close-proximity can be set based on a predefined threshold (e.g., a distance of under 100 meters may be determined to be in close-proximity).

Figure 3A:
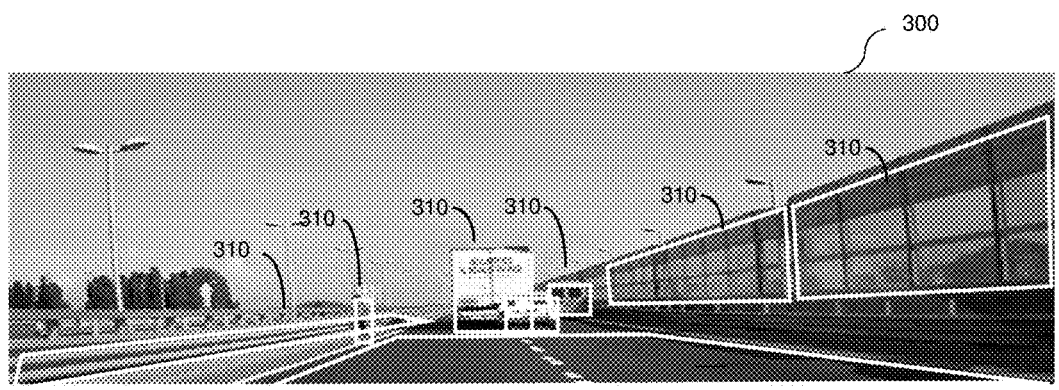
FIG. 3A and 3B show identification of objects in an image according to an embodiment.
Figure 3B:
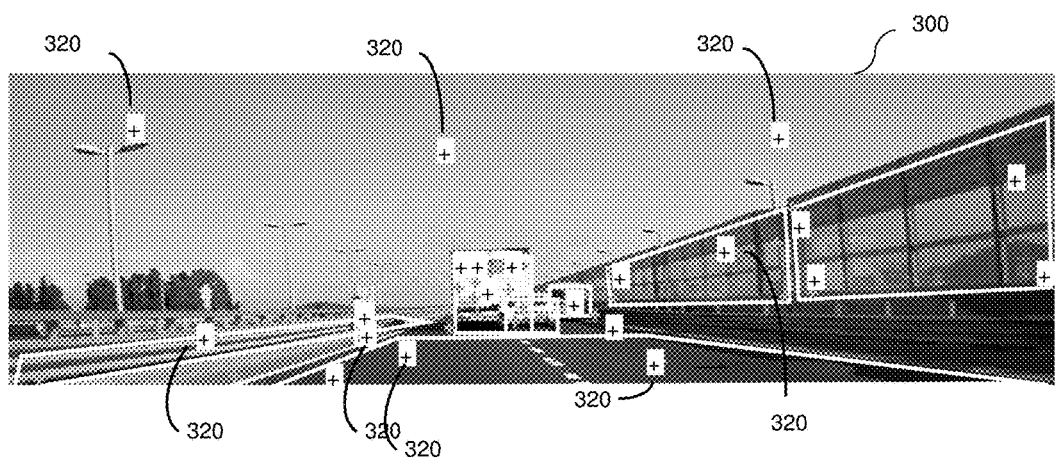

Consideration of certain (e.g., suspicious) objects allows reducing the number of active measurements by the active sensor 220. This is further demonstrated in reference to FIGS. 3A and 3B showing an example image of a scene for which a 3D-map is generated according to the disclosed embodiment. First, an image 300 of the environment is acquired by the passive sensor 230. The image 300 is segmented to identify objects 310. The segmentation and identification of objects can be performed using conventional image processing techniques. For example, the road, pedestrian, car, van, truck, crash barrier, and noise barrier are identified as objects 310. Then, object classification and passive measurements are performed. Based on the object classification, it is determined which active measurements should be made, that is, where to direct the laser beams emitted by the active sensor 220. The classification of objects may determine which objects are stationary, non-stationary, and suspicious. For example, the pedestrian, the car, the van, and the truck are classified as non-stationary and suspicious objects and, as such, active measurements in many different directions are triggered at locations 320 based, in part, on the object classification. The road, crash barrier, sky, road and sound barrier wall are classified as stationary and non-suspicious objects and, accordingly, fewer active measurements are performed.

As demonstrated by FIG. 3B, only a portion of the scene acquired in the image 300 is scanned with the active sensor 220. The locations that are actively measured are labeled as 320. Performing a greater number of active measurements on a limited number of objects allows for providing a higher resolution with respect to these objects. This further enables providing higher resolution in certain areas where detail recognition is required.

It should be noted that FIGS. 3A and 3B are merely examples and do not limit the various disclosed embodiments. In particular, more, fewer, or different objects 310 and/or 320 may be identified for images without departing from the scope of the disclosure.

Once all measurements are completed, a 3D-map of the scene may be generated. Specifically, the 3D-map is generated by computing the distance of the apparatus from any pixel in the acquired image. That is, each pixel should be associated with a distance value in order to generate the 3D-map. The distance values may be derived from the passive measurements and active measurements. In an embodiment, only a set of distance measurements are performed (e.g., fewer measurements than the number of pixels). The distance values can be computed or extrapolated using a plane equation or other equivalent techniques.

Returning to FIG. 2, the processing system 210 may comprise or be a component of a processor (not shown) or an array of processors coupled to the memory 215. The memory 215 contains instructions that can be executed by the processing system 210. The instructions, when executed by the processing system 210, cause the processing system 215 to perform the various functions described herein. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system 210 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The storage 240 may be magnetic storage, optical storage, and the like, and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

In one configuration, computer readable instructions for implementing any of the embodiments disclosed herein may be stored in the storage 240. The storage 240 may also store other computer readable instructions to implement an operating system, an application program, and the like. Computer readable instructions may be loaded in the memory 215 for execution by the processing system 210. The storage 240 may also be configured to store, for example, images, generated 3D-maps, 3D or 2D maps provided by mapping services (e.g., street-level maps), and the like.

The network interface 260 may allow the apparatus 200 to communicate with other apparatuses such as, but not limited to, a controller of the vehicle (not shown), a central controller (not shown), and a cloud storage device (not shown). For example, the network interface 260 may be configured to allow the apparatus 200 to communicate with the controller of the vehicle to provide operating instructions (e.g., stop, turn right, etc.) over a network (not shown). In an embodiment, the network interface 340 allows remote access to the apparatus 200 for the purpose of, for example, configuration, loading of new maps, and so on. The network interface 260 may include a wired connection or a wireless connection. The network interface 260 may transmit and/or receive communication media. For example, the network interface 260 may include a modem, a network interface card (NIC), an integrated network interface, a radio frequency transmitter/receiver, an infrared port, a USB connection, and the like.

Figure 4:
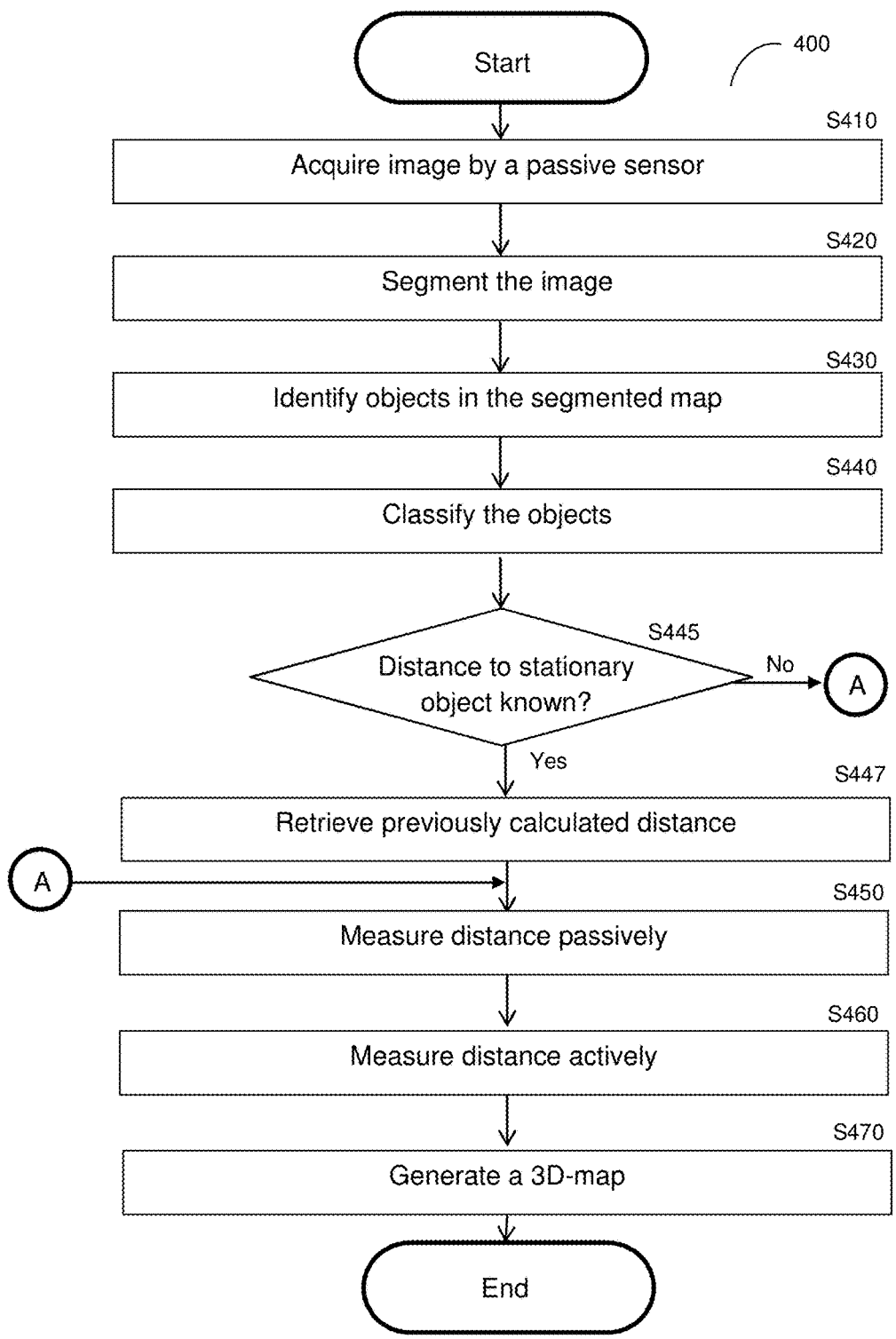
FIG. 4 is a flowchart illustrating a method for generating a 3D-map of a scene according to an embodiment.

FIG. 4 is an example flowchart 400 illustrating a method for generating 3D-maps of a scene according to an embodiment. In an embodiment, the method may be performed by an apparatus (e.g., the apparatus 200) operable in, e.g., a vehicle and the generated 3D-map is of the scene as would have been seen by an operator of the vehicle. The 3D-map may be generated based on fusion of passive and active measurements.

At S410, one or more images is acquired by a passive sensor. In an embodiment, the acquired images are saved in a memory according to their acquisition order. In another embodiment, the acquired images may include frames from a video being continually recorded.

At optional S420, the image may be segmented to generate a segmentation map. The segmentation map includes a plurality of segments, each of which features homogeneous pixels having the same color or substantially similar colors.

At optional S430, objects in the image or in the segmentation map are identified. In one embodiment, the objects may be identified based on, e.g., image recognition. It should be noted that an object can include multiple segments. For example, a truck colored with two different colors can be segmented as two segments, but identified as one object.

At optional S440, the identified objects are classified. In an embodiment, the objects may be classified into one or more of the following categories: non-stationary (i.e. moving or likely to move), stationary (i.e., immobile), non-suspicious, or non-suspicious. In an embodiment, whether an object is non-stationary or stationary may be determined by identifying the object (e.g., using image recognition) and based on its type. For example, an object showing a building may be classified as non-stationary. In another embodiment, the non-stationary or stationary category of an object is determined by comparing two consecutive images taken during a predefined time interval to determine if the location of an object has changed. If the location of the object remains the same, the object is classified as stationary; otherwise, the object may be classified as non-stationary. In another embodiment, the object classification for some of the identified objects may be based on the size of the identified object. As a non-limiting example, an object having a size above a predefined threshold (e.g., an object large enough that a vehicle would need to navigate around the object) may be classified as suspicious, but an object having a size below the predefined threshold (e.g., an object small enough that the vehicle can ride over the object safely) may be classified as non-suspicious.

In yet another embodiment, the object classification for any of the identified objects may be based on the presence or absence of edges and/or patterns. Accordingly, objects having clear edges or patterns (e.g., objects having edges or patterns shown in images with clarity above a predefined threshold) may be classified as such. In an embodiment, the distances to objects having clear edges or patterns may be determined via passive measurements, while objects not having clear edges or patterns may be determined via active measurements.

In an embodiment, the classification based on the image comparisons may be further based on movement (or lack thereof) and/or positioning of the passive sensor. Specifically, when the passive sensor is not in motion (e.g., the vehicle stops at a traffic light) and the two consecutive images are taken from the same angle, the comparisons may indicate changes in the location of a moving object relative to other objects. When the passive sensor itself is in motion, the two consecutive images are taken from different angles. To allow accurate comparison, in an embodiment, a second image (e.g., the subsequently taken image) may be transformed to match an angle of a first image (e.g., a previously taken image), thereby placing the two images at the same angle. The image transformation can be performed using a virtual camera technique. It should be noted that, in one scene, an object can be classified as stationary, while in the next scene the object may be classified as non-stationary (e.g., a parked car). In an embodiment, the classification of stationary objects can be performed based in part on geographic maps such as 3D, 2D, street-view, and/or satellite maps provided mapping services. This allows identification of buildings and the like based on their known locations.

In an embodiment, the classification of suspicious objects is based on a predetermined list of suspicious objects. For example, objects predetermined to be suspicious may be, but are not limited to, other vehicles on the road, pedestrians, animals, debris on the road, and so on. The list can be dynamically updated. Typically, objects that are in close-proximity to the vehicle and may pose danger or hazard are classified as suspicious. It should be noted that an object can be classified as "suspicious and stationary" or "suspicious and non-stationary". The various embodiments for object classifications are discussed in detail above.

At S445, it is checked, for each object classified as stationary, if the distance to the object classified as stationary is known. If so, execution continues with S447; otherwise, execution continues with S450. At S447, the distance to the stationary object is retrieved from previous calculations. This distance information can be derived from previously generated 3D maps. A stationary object may be determined to be stationary relative to the previously generated 3D map. As an example, if a passive sensor is not moving, an object is stationary, and a previously determined passive measurement and/or active measurement distance is available for the object from that passive sensor, then the current passive measurement for the object may be determined to be the previously determined distance.

At S450, passive measurements are performed based on the acquired image. The passive measurements include measuring at least a distance from at least one, some or all the classified objects. As noted above, such measurements are performed if the information cannot be derived from previously generated 3D maps. In an embodiment, the distance from each object classified as "stationary" or "non-suspicious and non-stationary" is determined via the passive measurements. As noted above, the distance is passively measured for stationary objects when the distances of the stationary objects are not available. In an embodiment, the passive measurement may include determining the distance to an object in the acquired image using a known size (e.g., number of pixels) of the object, a distance from a valid reference point, a vanishing point and vanishing line, a movement of an apparatus or vehicle, and so on. Various embodiments for performing passive measurements are discussed in more detail herein below with reference to FIGS. 5 and 6. The distance measurements may be saved in a memory (e.g., memory 215). It should be noted that the distance measurement may be for all or any of the pixels composing the object.

In another embodiment, the passive measurements may be performed based on movements of objects classified as non-stationary and non-suspicious. To this end, passively measuring the distance may include, but is not limited to, determining a boundary speed of the object and a direction of movement of the object. The boundary speed is a speed at which the boundary (i.e., outer surface) of the object is traveling. Based on the determined boundary speed and direction, a distance to the object may be estimated. In an embodiment, the estimated distance may be further based on a previously known distance to the object and/or previously generated 3D-maps including the object.

At S460, active measurements are performed. In an embodiment, the active measurements may be performed by using an active sensor (e.g., the active sensor 220). Performing the active measurements may include measuring a distance from some or all of the classified objects. In an embodiment, the distance is actively measured from objects classified as "suspicious", "non-stationary", and/or "suspicious and non-stationary". In another embodiment, the distance is actively measured when a reliable passive measured cannot be achieved. Reliable passive measurements cannot be achieved include when, for example, one or more objects and/or details in the acquired image appear several times; the image contains plain areas with no definite texture (e.g., walls and sky); details (wheels in a car) in the image are hidden in another view; when only one image from a unique angle (e.g., when the passive sensor includes only one camera) is available for passive measurement; and when the image contains one or more noisy areas. By re-measuring such objects, the accuracy is increased and the number of false alarms is significantly decreased.

In an embodiment, S460 includes emitting a laser beam (or a light pulse) using a laser diode. The laser hits a target and a portion of the laser's energy is reflected back toward the active sensor. The returning signal is detected and the time elapsed between emission of the light pulse from the laser and the detection of the returned signal is determined. A distance measurement of the distance to the object may be determined based on the determined elapsed time. It should be noted that the distance measurement may be for any or all of the pixels composing the images. In an embodiment, multiple active measurements may be performed per object, where at each such measurement, a laser pulse is directed to a different angle. A resolution of the measurement may be based on the number of measurements performed for each object.

In a further embodiment, S460 may further include determining an energy level for each emitted light pulse. The determined energy levels may be set based on parameters such as, but not limited to, pulse power and/or transmission characteristics (e.g., pulse length). Thus, an energy level is lower than another energy level if, for example, the pulse length, power, and/or height is lower. The energy levels may be determined based on, but not limited to, the passive energy measurements. In yet a further embodiment, the energy levels may be determined based on analysis of images acquired via a passive sensor. Lower energy levels may be utilized for, e.g., objects that are closer (i.e., objects requiring lower energy levels to successfully detect return signals), objects that are susceptible to harm from light pulses (e.g., eyes of a person or light sensors), and so on. Determining energy levels for active measurements is described further herein below with respect to FIG. 5.

The timing, direction, and energy level for each emitted laser beam may be controlled to achieve an accurate distance measurement. In an embodiment, at least the direction of the laser beam is adjusted based on the time and location difference between the time that an image was acquired by the passive sensor and when the active measurement has been triggered. This is performed in order to compensate for the movement of the active sensor and/or a target object during that time. The direction in which to point the active sensor can be estimated using accelerometer information by determining a current location of the active sensor relative to its location when the image was acquired.

It should be noted that the active measurements performed at S460 may be based on other active transmissions or emissions such as, but not limited to, radar, sound, laser triangulation, and the like. It should be noted that S450 and S460 can be performed in parallel. For example, active measurements on can be performed in parallel on objects classified non-stationary and/or objects that cannot be passively measured.

In certain embodiments, the energy level of the emitted laser is controlled based on the proximity of object to the vehicle (or the active sensor). The proximity can be determined using previous active and/or passive measurements in the area being scanned. By controlling the energy level, the energy consumption of the active sensor may be reduced as compared to always using laser beams having the highest possible amount of energy. Further, controlling the energy levels reduces the risk of hurting human eyes by the laser beams as objects that are in close proximity will be scanned with relatively low energy levels.

At S470, a 3D map is generated based on the passive and active measurements. In order to generate a 3D-map of the scene, a distance value for pixel in the acquired image should be available. In an embodiment, one or more distance values may be included in the 3D map for each segment in the segmentation map. Each distance value can be one of the passive or active measurements. In a preferred embodiment, at least 3 distance values for at least 3 pixels of each a segment should be included in the 3D map.

As noted above, a segment may be part of an object or may be the entire object. The distance values of all pixels in a segment can be computed or extrapolated based on the at least 3 distance measurements. To this end, in an embodiment, the plane equation is computed based on at least 3 distance measurements for at least 3 pixels in each segment. The computed plane equation may be utilized to determine all distance values of pixels in the same segment and/or on the same surface. It should be noted that other geometric techniques can be utilized the compute the distance values of all pixels in a segment without departing from the scope of the disclosure. It should be further noted that for some segments, distance values for all the pixels will be available through the active or passive measurements and, therefore, there is no need to solve the plane equation for such segments.

In another embodiment, if distance values of all pixels cannot be estimated based on the plane equation, then more active measurements will be triggered. In a further embodiment, the additional active measurements may be set with higher energy levels than previous active measurements.

In yet another embodiment if all distance values of all pixels are available from previous frames, then a limited number of active measurements may be utilized (e.g., 3 measurements) and the rest of the distance values are adjusted from measurement previously performed.

The rendering of the 3D-surface of each segment causes rendering of 3D representations of the identified objects, thereby resulting in a 3D-map of the scene. The resulting 3D-map can be later utilized to, e.g., provide driving directions to a controller controlling the operation of the vehicle.

Figure 5:
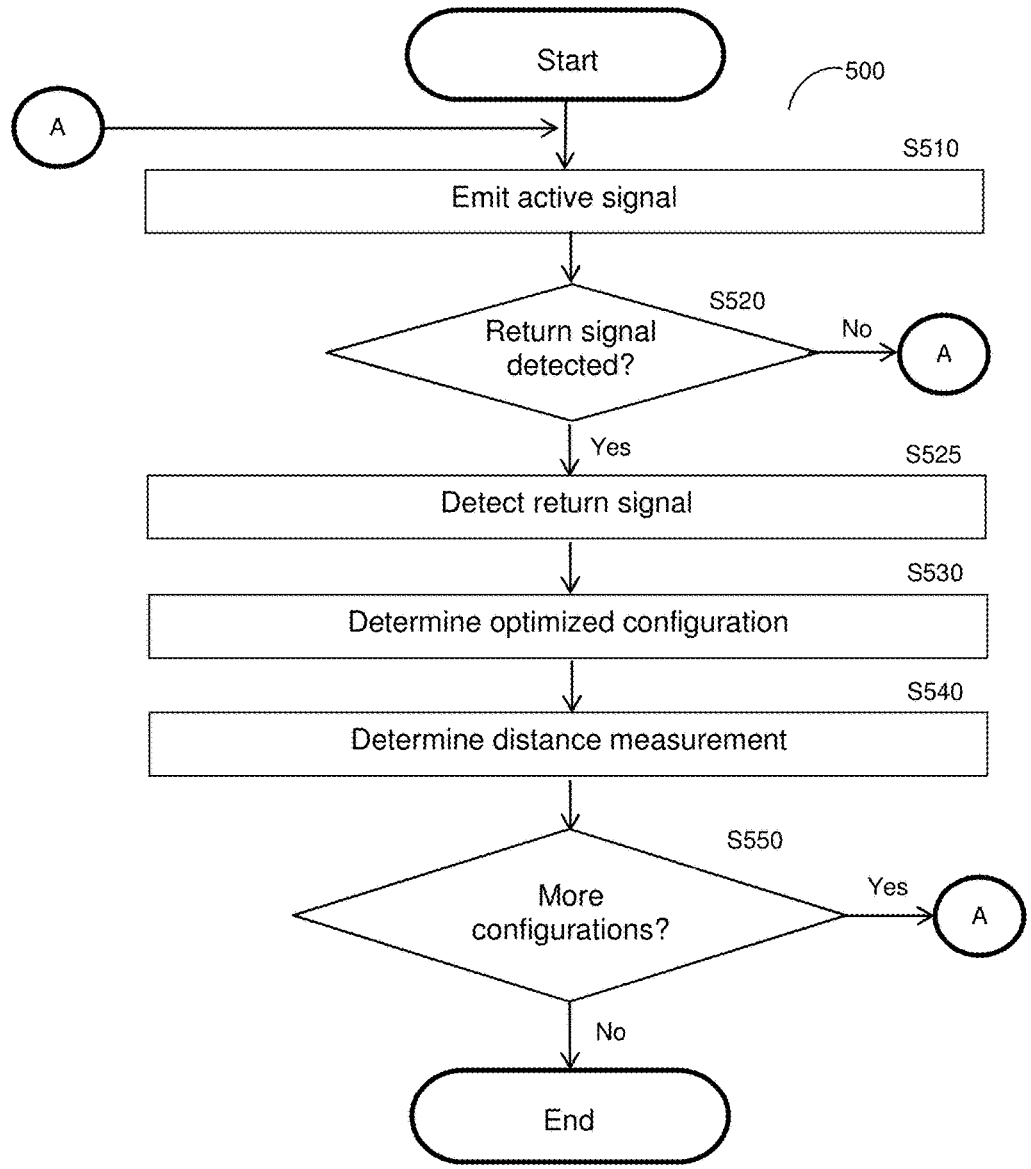
FIG. 5 is a flowchart illustrating a method for optimizing active measurements according to an embodiment.

FIG. 5 is an example flowchart 500 illustrating a method for optimizing active measurements for 3D-map generation according to an embodiment. The optimization aims to minimize energy consumption while maximizing accuracy of active measurements. In an embodiment, the optimized active measurements may include determining an optimized energy level for each direction in which lasers are emitted. In another embodiment, other active measurements may be optimized such as, e.g., radar, sound, laser triangulation, and the like.

At lower energy levels, return signals (e.g., reflections of the emitted lasers) may be undetectable. Further, even when the energy level is at a minimum required energy level for detection, misdetection of the return signals may occur due to noise. At higher energy levels, the emitted lasers waste energy and/or can cause harm to humans and/or sensors. Thus, the optimization aims to minimize energy levels of emitted lasers while maintaining accurate detections of return signals. The optimized energy levels may be set based on, but not limited to, pulse power and/or transmission characteristics (e.g., pulse length). Thus, an energy level is lower than another energy level if, for example, the pulse length, power, and/or height is lower.

At S510, a laser is emitted in a particular direction. In an embodiment, an energy level of the currently emitted laser may be based on an energy level of a laser previously emitted in that direction. In a further embodiment, the current energy level may be further based on a strength of a return signal detected for the previously emitted laser. If no return signal was detected for the previously emitted laser in that direction, the current energy level may be higher than the previously emitted energy level.

In another embodiment, if no laser was previously emitted in that direction, a default energy level may be utilized. The default energy level may be a predetermined level such as, for example, the highest possible energy level or the highest permitted energy level given regulatory constraints. Alternatively, the default energy level may be set equal to an optimized energy level determined for lasers emitted in another direction. In a further embodiment, the default energy level may be further based on an estimated distance of an object in the current direction of emission. For example, a default energy level utilized for an object that is estimated to be 5 meters away from a source of emission may be lower than a default energy level utilized for an object that is estimated to be 20 meters away. Determining energy levels for active measurements based on estimated distances is described further herein below with respect to FIG. 6.

In yet another embodiment, a default energy level may be utilized based on a predetermined model of a scene in which the active measurements will be performed. The default energy level utilized may be an upper bound energy level for an active sensor at the scene emitting a laser in the current direction of emission. The upper bound energy level may be based on, a maximum range of the beam within the scene. For example, the maximum range of the beam may be a distance from the active sensor to a wall of a room in a particular direction. Utilization of default energy levels based on the highest required energy level for a given scene rather than simply the highest possible or permitted energy level allows for use of reduced energy levels even at the beginning of determining optimized energy levels for active measurement.

In another embodiment, the direction of emission may be determined so as to emit the laser toward a particular pixel in a passively acquired image. Thus, in an embodiment, the optimization may be per pixel in the image such that an optimal energy level may be determined for each pixel in the image. In a further embodiment, the default energy level utilized for any such pixel may further be based on an optimized energy level determined for an adjacent pixel. In another embodiment, the default energy level may be based on an estimated distance determined via passive measurement.

At S520, it is determined whether a return signal was detected for the currently emitted laser and, if so, execution continues with S525; otherwise, execution continues with S510. If a return signal was not detected, at S510, the next laser emitted may be in the same direction as the currently emitted laser but using a higher energy level. In an embodiment, the energy level may be increased by a predetermined increment. At S525, a return signal is detected for the currently emitted signal. The return signal may be, e.g., a reflected laser.

At S530, an optimized configuration for active measurement emissions is determined based on the detected return signal. In an embodiment, the optimized configuration may be further determined based on a strength of the detected return signal. In a further embodiment, the strength of the detected return signal may be compared to a predetermined return signal strength or a predetermined range of return signal strengths. The optimized configuration may be determined based on the comparison.

The optimized configuration may include, but is not limited to, an optimized energy level, a selection of one or more active sensors to perform the active measurement, an optimized path for active measurements, and so on.

The optimized energy level may be determined so as to cause an optimized return signal. The optimized return signal may include, for example, any return signal within a predetermined range of return signals. In an embodiment, the optimized energy level may be determined based on a difference between the optimized return signal and a return signal for a previously emitted laser. In a further embodiment, the optimized return signal may be further based on a type of object for which an active measurement is performed. The type of object may be determined based on, e.g., analysis of passive sensor information (e.g., image recognition of a passively acquired image). For example, an optimized return signal may be lower for lasers emitted at humans or light sensors in a scene than for other objects.

In a further embodiment, the optimized energy level may be further based on changes in passive sensor information. For example, if a previously emitted laser was reflected off of an object and the object has since moved as demonstrated by consecutive images, the current energy level may be determined based on the optimized energy level for the previously emitted laser and a change in distance determined based on passive measurements.

The optimized configuration may include a selection of which active sensors to perform active measurements on an object when multiple active sensors are available. For example, if multiple active sensors are utilized in a room or if multiple active sensors are attached to a vehicle. The active sensor(s) to perform active measurements may be determined such that the lowest energy level may be required. To this end, the selected active sensor(s) may be the active sensor(s) that is/are closest to the object. Alternatively or collectively, the active sensor(s) to be utilized may be selected based on an angle of the object relative to the available active sensors.

In another embodiment, the optimized configuration may include an optimal path between locations in the scene for which a plurality of active measurements will be taken. The optimal path may be utilized to reduce time and energy utilized to change direction of the active emissions when performing multiple active measurements. The plurality of active measurements may be performed by, e.g., utilizing one or more mirrors or MEMS mirrors to capture return signals based on active emissions and moving the mirrors or MEMS mirrors based on the directions of the active emissions.

The optimal path may be determined based on, but not limited to, a time for changing the direction of the active emission from a first direction to a second direction, movements (direction, speed, acceleration, etc.) of the apparatus 200 and/or of mirrors or MEMS mirrors, a minimum time needed between measurements (e.g., 2 microseconds), and the like. The minimum time needed between active measurements may be further based on, e.g., a maximum range for objects in the scene. The optimal path may be determined such that the time between active measurements is minimized.

At S540, a distance measurement may be determined based on the return signal. The distance measurement may be based on, but not limited to, a time of flight of the laser. The distance measurement may be utilized for, e.g., determining optimized configurations for additional directions.

At S550, it is checked whether optimal configurations for additional directions are required and, if so, execution continues with S510, where the laser is emitted in a new direction. Otherwise, execution terminates.

Figure 6:
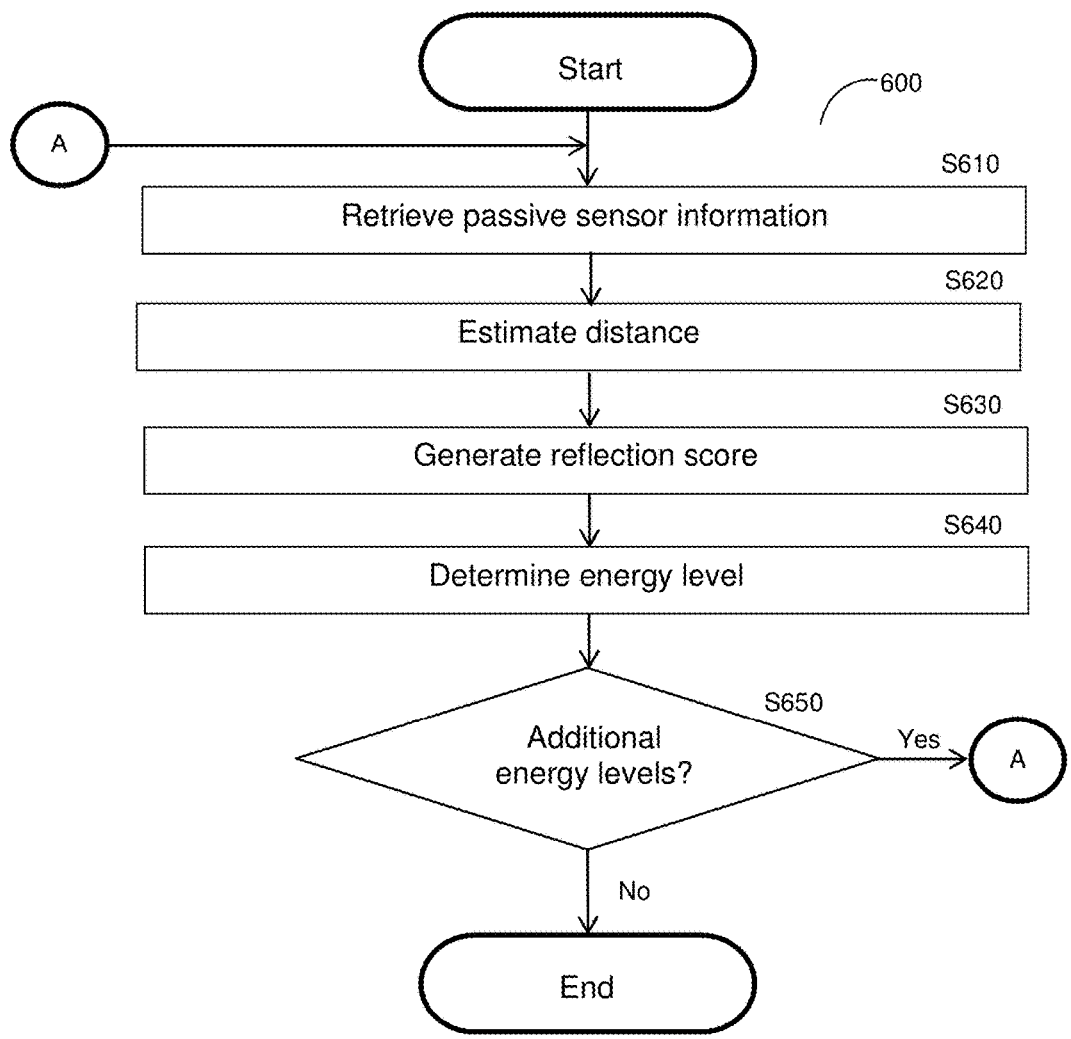
FIG. 6 is a flowchart illustrating a method for determining energy levels for active measurements based on estimated distances according to an embodiment.

FIG. 6 is an example flowchart 600 illustrating a method for determining energy levels for active measurements based on passive sensor information according to an embodiment. The determined energy level may be utilized, e.g., as a default energy level when determining an optimized configuration for active measurement, or may be utilized as an optimized energy level in an optimized configuration for active measurement.

At S610, information related to distance of objects is retrieved. In an embodiment, the information is retrieved from a passive sensor. The passive sensor information may include, but is not limited to, an image acquired by the passive sensor. In another embodiment, such information is based on previous active measurements.

At S620, a distance is estimated based on the retrieved information. The distance may be to an object or a portion thereof. In an embodiment, the estimated distance may be for a pixel in the image. The distance may be estimated based on, but not limited to, a previously determined distance, a previously determined location of the object, a speed and direction of a moving object, and the like. In an embodiment, if the distance is within a range, the estimated distance may determine to be, e.g., the maximum distance in the range, the average distance in the range, and the like. Estimating distances based on passive sensor information is described further herein above with respect to FIGS. 2 and 4.

At optional S630, a reflection score may be generated for the object. The reflection score represents a degree to which light is reflected off of the object and may be based on, but is not limited to, a color of the object, an orientation of the object, a surface roughness of the object, light, combinations thereof, and the like. To this end, S630 may further include determining a material of the object based on the passive sensor information. The material may be associated with, e.g., a predetermined known color or roughness. The material may be determined via, e.g., image recognition techniques.

At S640, an energy level for active measurement is determined based on the estimated distance and/or the reflection score. In an embodiment, determining the energy level may be further based on previous return signal strengths for particular distances and/or reflection scores. The previous return signal strengths may be based on, e.g., machine learning for previous measurements. The previous return signal strengths associated with particular distances and/or reflection scores may be stored in a translation table. If the determined energy level is subsequently utilized for an active measurement, the resulting return signal strength may be utilized to update the translation table.

At S650, it is determined whether additional energy levels are required and, if so, execution continues with S610; otherwise, execution terminates. In an embodiment, additional energy levels may be required if energy levels have not been determined for any pixels in an image and/or if a new image is acquired by a passive sensor.

It should be noted that the embodiments discussed herein above are described with respect to active measurements by lasers merely for simplicity purposes and without limitations on the disclosure. Other active measurements (such as, e.g., by radar, sound, laser triangulation, and the like) may be equally utilized without departing from the scope of the disclosed embodiments.

It should be noted that some disclosed embodiments are described with respect to optimizing active measurements for a vehicle merely for example purposes and without limitation on the disclosure. Any apparatus configured to collect active measurements such as a vehicle, a camera for capturing video for 3D movies, and the like, may be utilized without departing from the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for optimizing active measurements by a system for measuring distance from an active sensor of the system, the system having a passive sensor for acquiring images, comprising:
    emitting at least one active signal from the active sensor in at least one direction at an energy level based on at least an image acquired by the passive sensor;
    determining whether a return signal is detected for each of the at least one active signal;
    upon detecting at least one return signal for the at least one active signal:
    measuring a strength of each return signal;
    comparing the measured strength of each return signal to at least one optimal return signal strength;
    determining a distance to an object identified in the image based on the at least one detected return signal; and
    determining an optimized configuration for active measurement emissions in one or more directions based on the comparison and on a passively measured distance to the object.

2. The method of claim 1, wherein the optimized configuration includes at least one of: an optimized energy level, a selection of at least one active sensor, and an optimized path.

3. The method of claim 2, wherein the optimized energy level of an active measurement emission is based on at least one of: a pulse power level, and a pulse length.

4. The method of claim 1, wherein an energy level of each of the at least one active emitted signal is based on a maximum range of active signals in the at least one direction.

5. The method of claim 4, wherein the maximum range of active signals in the at least one direction is based on a predetermined model of a scene.

6. The method of claim 1, further comprising:
emitting another active signal in the at least one direction, when it is determined that a return signal is not detected for an unreturned active signal of the at least one active signal, wherein an energy level of the other active signal is higher than an energy level of the unreturned active signal.

7. The method of claim 1, further comprising:
generating a reflection score for the object based on passive sensor information, wherein the optimized configuration for active measurement emissions is further based on the reflection score.

8. The method of claim 1, further comprising:
determining the optimized configuration for active measurement emissions based on an estimated distance to at least one target object, wherein the estimated distance is based on a predetermined model of a scene.

9. A non-transitory computer readable medium having stored thereon instructions for causing one or more processing units to execute the method according to claim 1.

10. An apparatus for optimizing active measurements by a system for measuring distance, comprising:
an active sensor from which distance is measured;
a passive sensor for acquiring images;
a control circuit configured to:
control the active sensor to emit at least one active signal in at least one direction at an energy level based on at least an image acquired by the passive sensor;
determine whether a return signal is detected for each of the at least one active signal;
upon detecting at least one return signal for the at least one active signal,
measure a strength of each return signal;
compare the measured strength of each return signal to at least one optimal return signal strength;
determine a distance to an object identified in the image based on the at least one detected return signal;
determine an optimized configuration for active measurement emissions in one or more directions based on the comparison and on a passively measured distance to the object; and
configure the active sensor with the optimized configuration.

11. The apparatus of claim 10, wherein the optimized configuration includes at least one of: an optimized energy level, a selection of at least one active sensor, and an optimized path.

12. The apparatus of claim 11, wherein the optimized energy level of an active measurement emission is based on at least one of: pulse power, and pulse length.

13. The apparatus of claim 10, wherein an energy level of each of the at least one emitted active signal is a predetermined default energy level.

14. The apparatus of claim 13, wherein an energy level of each of the at least one active emitted signal is based on a maximum range of active signals in the at least one direction.

15. The apparatus of claim 14, wherein the maximum range of active signals in the at least one direction is based on a predetermined model of a scene.

16. The apparatus of claim 10, wherein the apparatus is further configured to:
emit another active signal in the at least one direction, when it is determined that a return signal is not detected for an unreturned active signal of the at least one active signal, wherein an energy level of the other active signal is higher than an energy level of the unreturned active signal.

17. The apparatus of claim 10, wherein the apparatus is further configured to:
generate a reflection score for the object based on passive sensor information, wherein the optimized configuration for active measurement emissions is further based on the reflection score.

18. The apparatus of claim 10, wherein the apparatus is further configured to: determine the optimized configuration for active measurement emissions based on an estimated distance to at least one target object, wherein the estimated distance is based on a predetermined model of a scene.

19. A control circuit for controlling optimized active measurements by a system for measuring distance, wherein the control circuit is configured to:
cause at least one active sensor to emit at least one active signal in at least one direction at an energy level based on at least an image acquired by a passive sensor;
determine whether a return signal is detected by the at least one active sensor for each of the at least one active signal;
upon detecting at least one return signal for the at least one active signal:
measure a strength of each detected at least one return signal;
compare the measured strength of each return signal to at least one optimal return signal strength;
determine a distance to an object identified in the image based on the at least one detected return signal; and
determine an optimized configuration for active measurement emissions in one or more directions based on the comparison and on a passively measured distance to the object.

20. A method for optimizing active measurements by a system for measuring distance, comprising:
receiving an image of a scene captured by a passive sensor;
analyzing the received image to estimate a distance to at least one object in the scene;
determining, based on the estimated distance, an optimized configuration for active measurement emissions in one or more directions to be used in measuring distance;
setting an active sensor to perform the active measurement emissions based on the optimized configuration for distance measurement; and
determining a distance to an object identified in the image based on at least one return signal for the active measurement emissions for distance measurement.

* * * * *